(12) United States Patent
Chen

(10) Patent No.: US 7,995,298 B2
(45) Date of Patent: Aug. 9, 2011

(54) ILLUMINATION SYSTEM

(75) Inventor: S-Wei Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 421 days.

(21) Appl. No.: 11/849,720

(22) Filed: Sep. 4, 2007

(65) Prior Publication Data
US 2008/0253005 A1 Oct. 16, 2008

(30) Foreign Application Priority Data
Apr. 16, 2007 (TW) ................. 96206078 U

(51) Int. Cl.
*G02B 5/04* (2006.01)
*G02B 27/18* (2006.01)
*F21V 5/02* (2006.01)
*F21V 5/04* (2006.01)

(52) U.S. Cl. ........ 359/831; 359/837; 362/259; 362/277; 362/335; 362/339

(58) Field of Classification Search ............. 359/831, 359/837; 355/67; 362/259, 277, 326, 332, 362/335, 336, 337, 339
See application file for complete search history.

(56) References Cited

U.S. PATENT DOCUMENTS

| | | | | |
|---|---|---|---|---|
| 3,547,526 A * | 12/1970 | Devereux | ...................... | 359/729 |
| 5,035,486 A * | 7/1991 | Inokuchi | ...................... | 359/625 |
| 5,195,159 A * | 3/1993 | Uenishi et al. | ................. | 385/122 |
| 5,276,694 A * | 1/1994 | Wolf et al. | ......................... | 372/20 |
| 5,287,142 A * | 2/1994 | Kamon | ............................ | 355/53 |
| 5,309,198 A * | 5/1994 | Nakagawa | ........................ | 355/67 |
| 5,629,808 A * | 5/1997 | Powell | ............................ | 359/719 |
| 5,675,401 A * | 10/1997 | Wangler et al. | .................. | 355/67 |
| 5,726,740 A * | 3/1998 | Shiozawa et al. | ................ | 355/67 |
| 6,185,051 B1 * | 2/2001 | Chen et al. | ....................... | 359/709 |
| 6,259,512 B1 * | 7/2001 | Mizouchi | ......................... | 355/67 |
| 6,377,336 B1 * | 4/2002 | Shiraishi et al. | .................. | 355/67 |
| 6,452,662 B2 * | 9/2002 | Mulkens et al. | .................. | 355/67 |
| 6,897,944 B2 * | 5/2005 | Shiozawa | ......................... | 355/71 |
| 6,961,194 B2 * | 11/2005 | Penn | ................................ | 359/833 |
| 7,030,383 B2 | 4/2006 | Babayoff et al. | | |
| 7,123,394 B2 * | 10/2006 | Rehm et al. | ................. | 359/219.2 |
| 7,446,858 B2 * | 11/2008 | Kudo et al. | ....................... | 355/71 |
| 7,511,886 B2 * | 3/2009 | Schultz et al. | ................. | 359/489 |
| 2002/0085276 A1 * | 7/2002 | Tanitsu et al. | .................. | 359/432 |
| 2003/0038931 A1 * | 2/2003 | Toyoda et al. | ................... | 355/67 |

* cited by examiner

*Primary Examiner* — Ricky D Shafer
(74) *Attorney, Agent, or Firm* — J.C. Patents

(57) ABSTRACT

An illumination system including at least one coherent light source, a light uniforming element, and a prism is provided. The coherent light source is capable of emitting a coherent beam. The light uniforming element is disposed on a transmission path of the coherent beam. The prism is disposed on the transmission path of the coherent beam and between the coherent light source and the light uniforming element. The prism has a light incident end and a light exit end. The light incident end has at least one incident polygonal pyramid portion protruding away from the light exit end. The prism is capable of rotating about an axis, and the axis extends from the light incident end to the light exit end. The illumination system effectively reduces the degree of the speckle phenomenon.

13 Claims, 12 Drawing Sheets

ILLUMINATION SYSTEM

CROSS-REFERENCE TO RELATED APPLICATION

This application claims the priority benefit of Taiwan application serial no. 96206078, filed Apr. 16, 2007. All disclosure of the Taiwan application is incorporated herein by reference.

BACKGROUND OF THE INVENTION

1. Field of the Invention

The present invention relates to an illumination system. More particularly, the present invention relates to an illumination system using a coherent light source.

2. Description of Related Art

Referring to FIG. 1, a conventional laser projection apparatus 100 including an illumination system 110, a digital micro-mirror device (DMD) 120, and a projection lens 130. The illumination system 110 includes a laser light source 112, a plurality of lenses 114, and a light integration rod 116. A laser beam 113 emitted from the laser light source 112 is expanded by the lens 114 and uniformed by the light integration rod 116 to become an illumination beam 113a. After being projected onto the DMD, the illumination beam 113a is converted by the DMD into an image beam 113b. The image beam 113b is projected onto a screen (not shown) through the projection lens 130, thus forming a display image.

FIG. 2 shows a speckle pattern projected on the screen by the laser projection apparatus in FIG. 1. Referring to FIGS. 1 and 2, due to the high coherence of the laser beam 113, after the laser beam 113 passes through an optical component (such as a lens, a reflector) having a slightly uneven surface in the laser projection apparatus 100, a speckle pattern formed by the laser beam 113 is generated on the screen due to the interference phenomenon of the laser beam 113. The speckle pattern is an irregular noise pattern. The speckle phenomenon causes a non-uniform brightness of the display image, thus degrading the optical quality of the laser projection apparatus 100.

SUMMARY OF THE INVENTION

The present invention provides an illumination system, which effectively reduces the degree of the speckle phenomenon.

Other advantages of the present invention can be further understood from the technical features disclosed by the present invention.

In order to achieve one or a part of or all of the above-mentioned advantages or other advantages, an illumination system comprising at least one coherent light source, a light uniforming element, and a prism is provided. The coherent light source is capable of emitting a coherent beam. The light uniforming element is disposed on a transmission path of the coherent beam. The prism is disposed on the transmission path of the coherent beam and between the coherent light source and the light uniforming element. The prism has a light incident end and a light exit end. The light incident end has at least one incident polygonal pyramid portion protruding away from the light exit end. Moreover, the prism is capable of rotating about an axis, and the axis extends from the light incident end to the light exit end.

In the illumination system of the present invention, the prism rotates, and the incident polygonal pyramid portion splits the coherent beam into a plurality of beams incident on the light uniforming element from different angles, and thus the spots formed on the light incident section of the light uniforming element by the beams rotate with the rotation of the prism, and the incident angles of the beams on the light uniforming element vary with the rotation of the prism. Therefore, the speckle pattern output by the illumination system changes with time. Due to visual persistence effect, human eyes observe the superposition of the speckle patterns of different time points in a visual persistence time interval. The speckle distributions in the speckle patterns at different time points are different, such that a pattern having a more uniform brightness is generated after the superposition. Therefore, the illumination system of the present invention effectively reduces the degree of the speckle phenomenon, and the projection apparatus using the illumination system of the present invention provides display images having uniform brightness.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
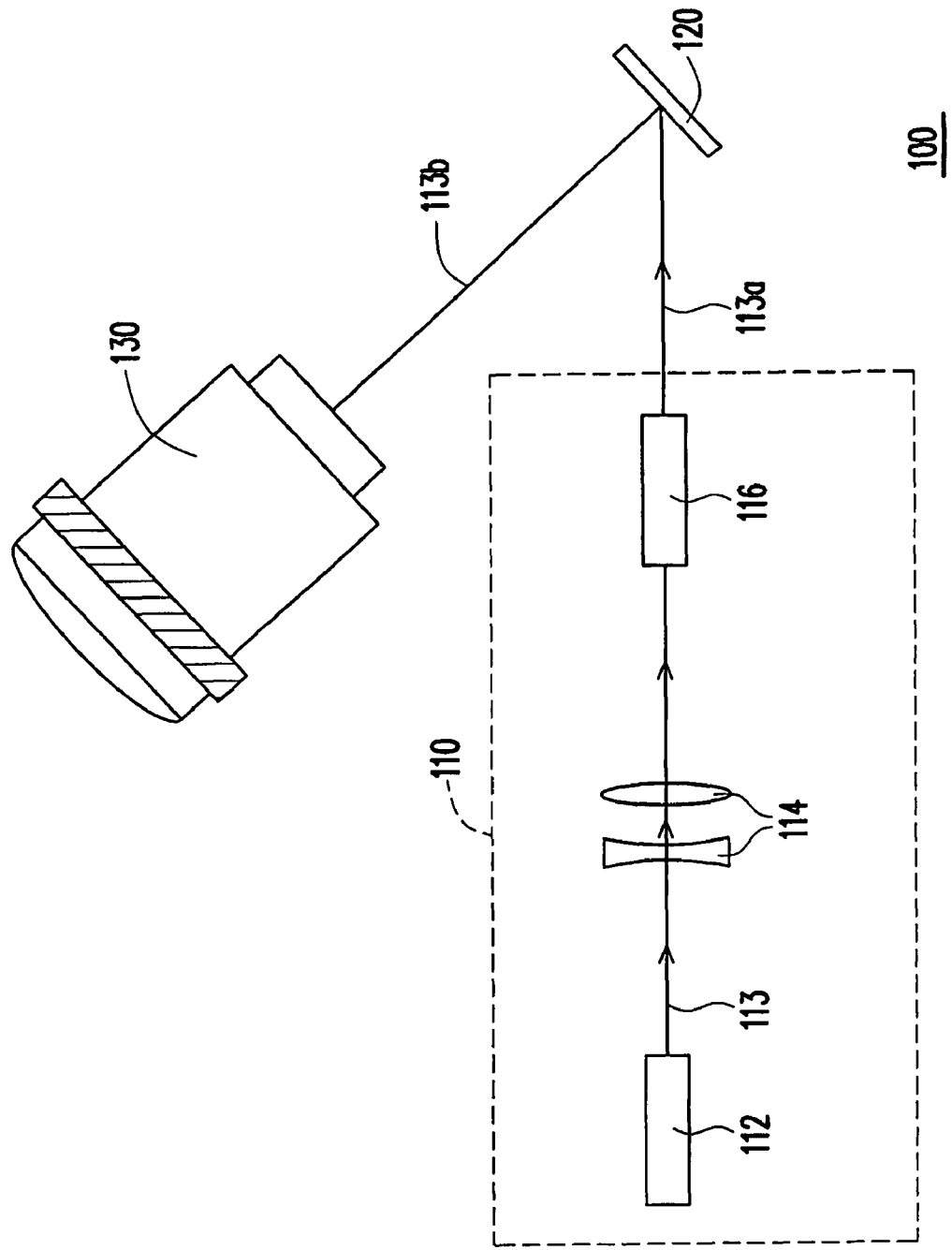
FIG. 1 is a schematic structural view of a conventional laser projection apparatus.
Figure 2:
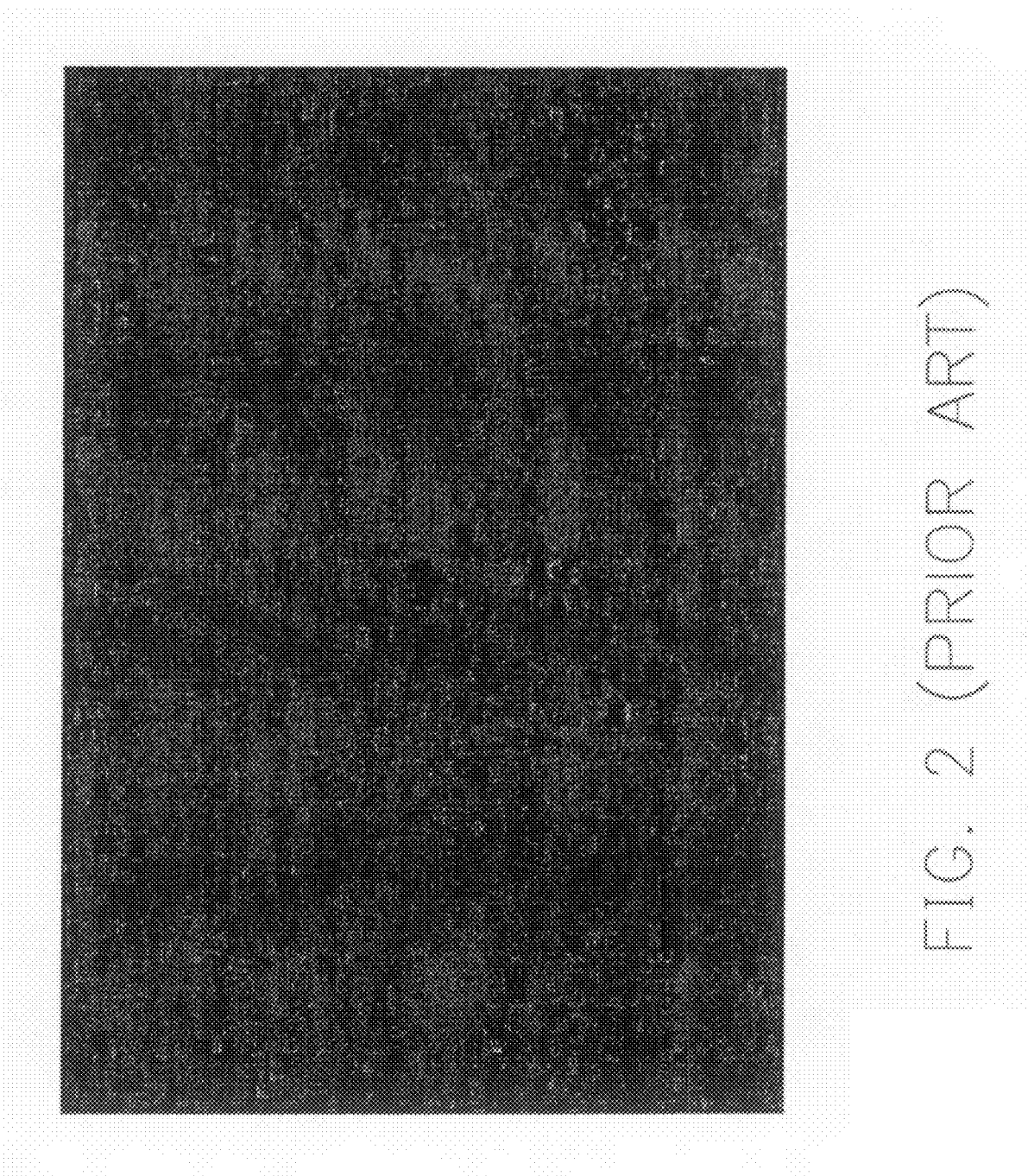
FIG. 2 shows a speckle pattern projected on a screen by the laser projection apparatus in FIG. 1.
Figure 3A:
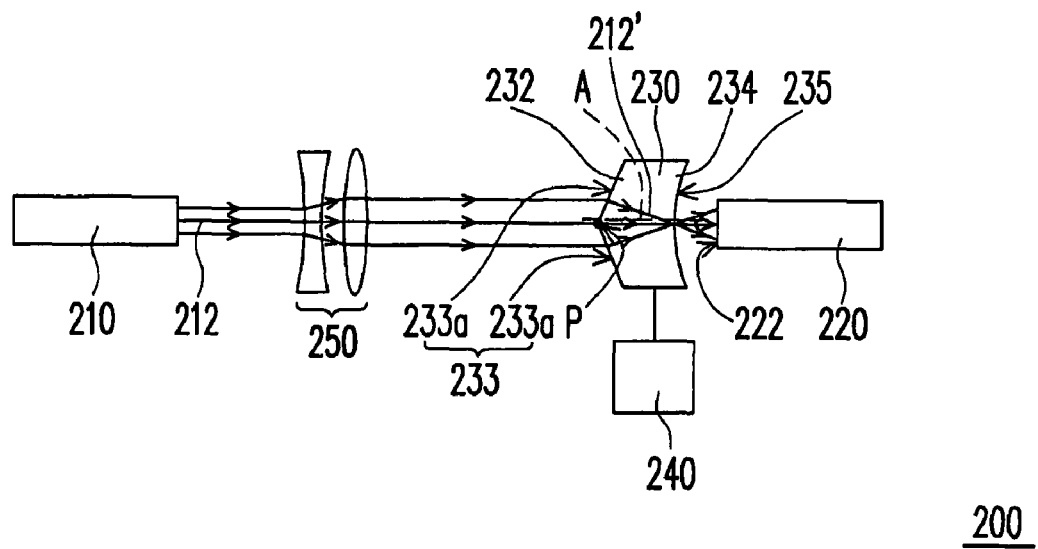
FIG. 3A is a schematic structural view of an illumination system according to an embodiment of the present invention.
Figure 3B:
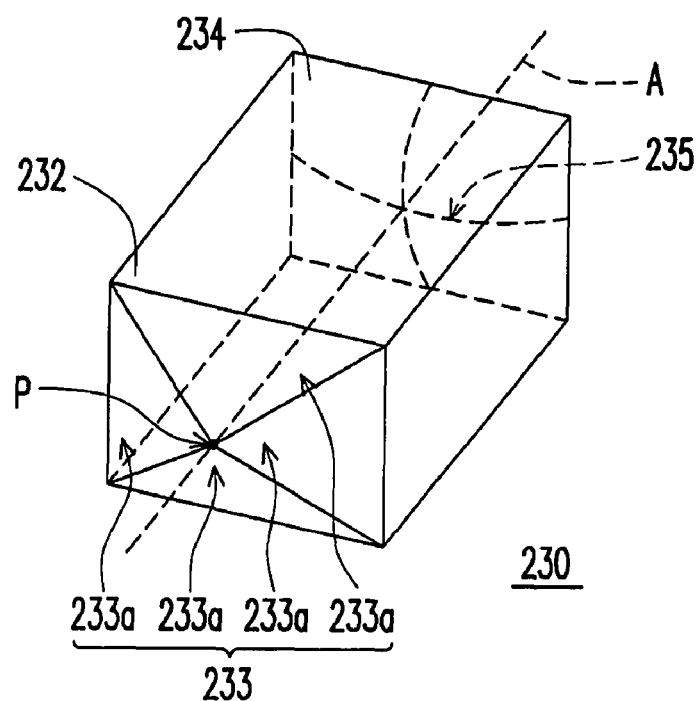
FIG. 3B is a perspective view of a prism in FIG. 3A.

Referring to FIGS. 3A and 3B, an illumination system 200 according to an embodiment of the present invention is applied in a projection apparatus. The illumination system 200 comprises a coherent light source 210, a light uniforming element 220, and a prism 230. The coherent light source 210 is capable of emitting a coherent beam 212. In this embodiment, the coherent light source 210 is, for example, a laser light source. The light uniforming element 220 is disposed on a transmission path of the coherent beam 210, such that the illumination system 200 outputs a uniform beam. In this embodiment, the light uniforming element 220 is, for example, a light integration rod. However, in other embodiments, the light uniforming element 220 is also a lens array or other elements capable of uniforming the beam. The prism 230 is disposed on the transmission path of the coherent beam 212 and between the coherent light source 210 and the light uniforming element 220.

Figure 3C:
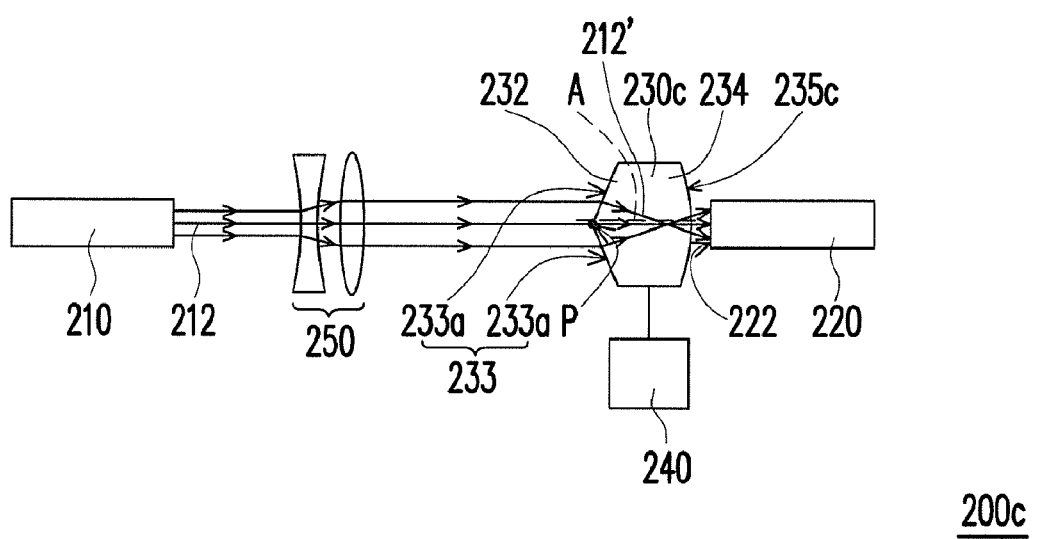
FIG. 3C is a schematic structural view of an illumination system according to another embodiment of the invention.

The prism 230 has a light incident end 232 and a light exit end 234. The light incident end 232 has an incident polygonal pyramid portion 233 protruding away from the light exit end 234. In this embodiment, the incident polygonal pyramid portion 233 is composed of a plurality of triangular facets 233a, and the number of the triangular facets 233a is greater than or equal to 3. In other words, the polygonal pyramid is, for example, trigonal pyramid, tetragonal pyramid, pentagonal pyramid . . . or N-sided pyramid, where N is an integer greater than or equal to 3. Moreover, in this embodiment, the light exit end 234 of the prism 230 has a curved light exit surface 235 denting towards the light incident end 232 or protruding away from the light incident end 232. The curved light exit surface 235 shown in FIG. 3A is a curved light exit surface denting towards the light incident end 232 as an example. In another embodiment, a curved light exit surface 235c of a prism 230c of an illumination system 200c shown in FIG. 3C is a curved light exit surface protruding away from the light incident end 232. However, in other embodiments, the light exit end 234 is also a light exit plane instead of the curved light exit surface 235, or the number of the curved light exit surfaces 235 of the light exit end 234 is also more than one.

The prism 230 is capable of rotating about an axis A, and the axis A extends from the light incident end 232 to the light exit end 234. In this embodiment, the axis A is substantially parallel to the chief ray of the coherent beam 212. Besides, the axis A passes through an apex P of the incident polygonal pyramid portion 233. Moreover, the illumination system 200 further comprises, for example, an actuator 240 connected with the prism 230 for driving the prism 230 to rotate. The actuator 240 is, for example, a motor or other mechanisms used for driving the prism 230 to rotate. In addition, the illumination system 200 further comprises a beam expander 250 disposed on the transmission path of the coherent beam 212 and between the coherent light source 210 and the prism 230, so as to expand the diameter of the coherent beam 212. The beam expander 250 comprises a lens or other optical components capable of expanding the diameter of the coherent beam 212.

Figure 4A:
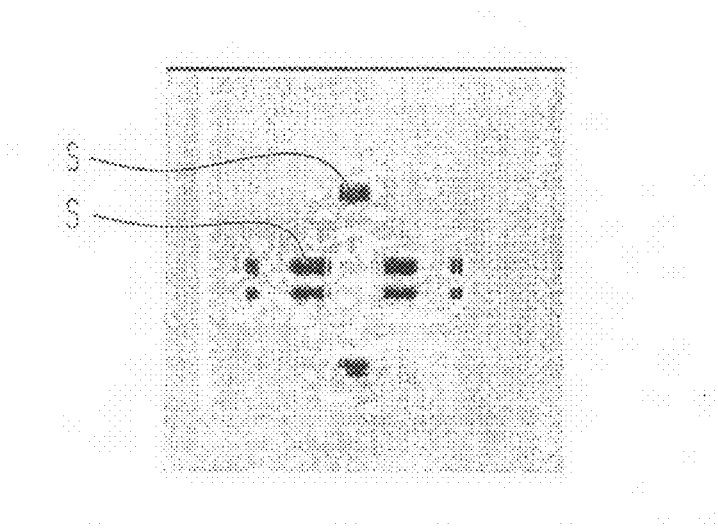
FIGS. 4A, 4B, and 4C respectively show positions of spots projected on a light incident section of a light uniforming element when the prism in FIG. 3A rotates to three different angles.
Figure 4B:
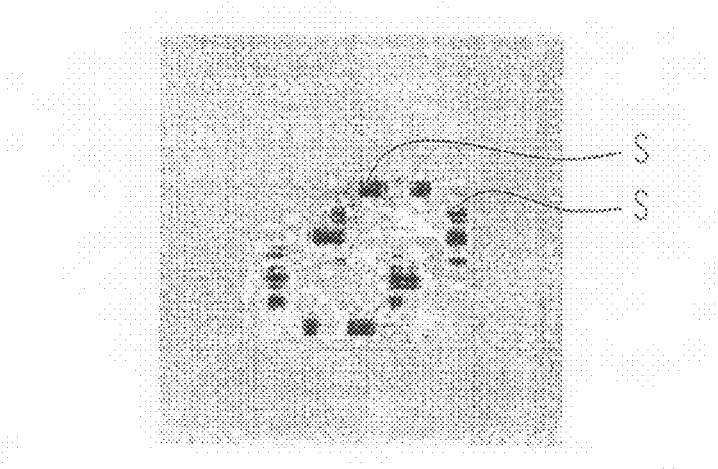
Figure 4C:
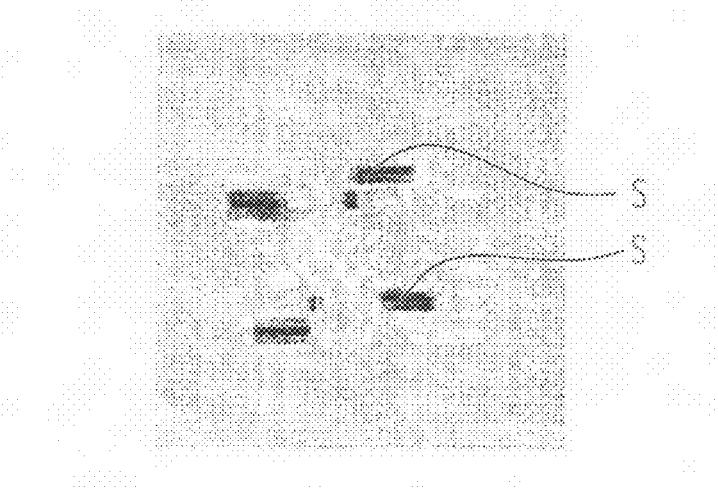

In the illumination system 200 of this embodiment, after passing through the incident polygonal pyramid portion 233, the coherent beam 212 is split into beams 212' by the incident polygonal pyramid portion 233, and the beams 212' are incident on the light uniforming element 220 from different angles and form a plurality of spots S (shown in FIG. 4A) on the light incident section 222 of the light uniforming element 220. The prism 230 rotates, so the position and angle of the beams 212' incident on the light incident section 222 change with time, such that the spots S (shown in FIG. 4A) rotate with the rotation of the prism 230. FIGS. 4A, 4B, and 4C show the positions of the spots S projected on the light incident section 222 when the prism 230 rotates to three different angles, respectively.

The spots S located on the light incident section rotates with the rotation of the prism 230, and the incident angle of the beams 212' on the light uniforming element 220 changes with the rotation of the prism 230, and thus the speckle pattern output by the illumination system 200 changes with time. Due to visual persistence effect, the human eyes observe the superposition of the speckle patterns at different time points in a visual persistence time interval. The speckle distributions in the speckle patterns at different time points are different, such that a pattern having a more uniform brightness is generated after the superposition. Therefore, the illumination system 200 of this embodiment effectively reduces the degree of the speckle phenomenon.

Moreover, each of the beams 212' split by the incident polygonal pyramid portion 233 forms a corresponding speckle pattern, so the speckle pattern generated at a time point in this embodiment is a superposition of a plurality of speckle patterns, such that the illumination system 200 of this embodiment remarkably reduces the degree of the speckle phenomenon. In order to further reduce the degree of the speckle phenomenon, in this embodiment, the chief ray of the coherent beam 212 passes through the apex P of the incident polygonal pyramid portion 233, so as to make each of the beams 212' split by the incident polygonal pyramid portion 233 having substantially the same intensity, and to further make the brightness of the speckle pattern more uniform after the superposition.

Experimental results show that the speckle ratio of the speckle pattern generated by the illumination system 200 in this embodiment is 6%, and the speckle ratio of the illumination system without using the prism 230 is 18%, in which the speckle ratio is defined as the ratio of a brightness standard deviation of the points in the speckle pattern to an average brightness of the points. Compared with the illumination system without using the prism 230, the illumination system 200 of this embodiment has the speckle ratio reduced by ⅔, thereby the illumination system 200 indeed effectively reduces the degree of the speckle phenomenon. However, the degree of the speckle phenomenon reduced in this embodiment is not limited in the scope of the present invention.

It should be noted that the present invention does not limit the number of the incident polygonal pyramid portion 233 of the light incident end 232 to be one. In other embodiments, the number of the incident polygonal pyramid portions 233 of the light incident end is also more than one, and the incident polygonal pyramid portions 233 are arranged in an array or other manners.

Figure 5A:
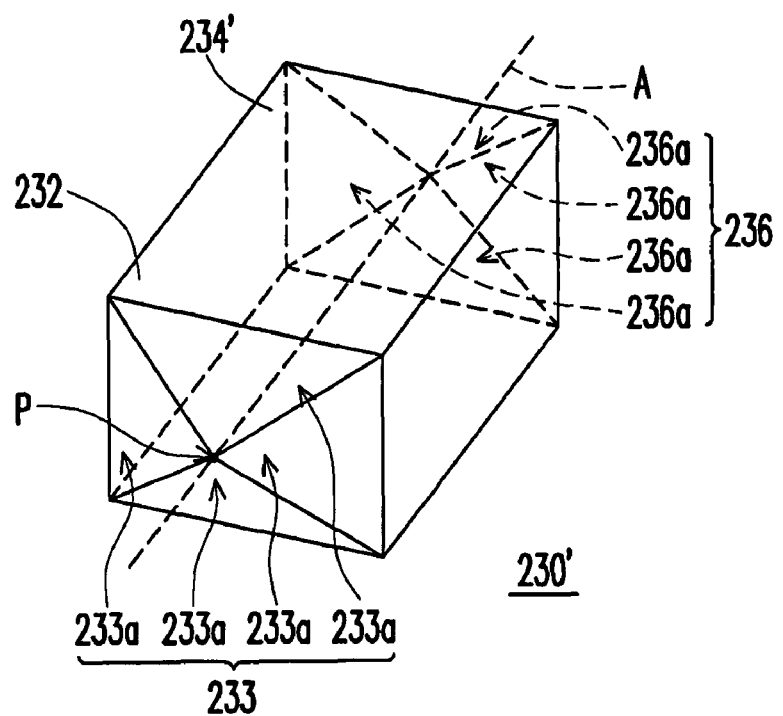
FIG. 5A is a perspective view of a prism in an illumination system according to another embodiment of the present invention.
Figure 5B:
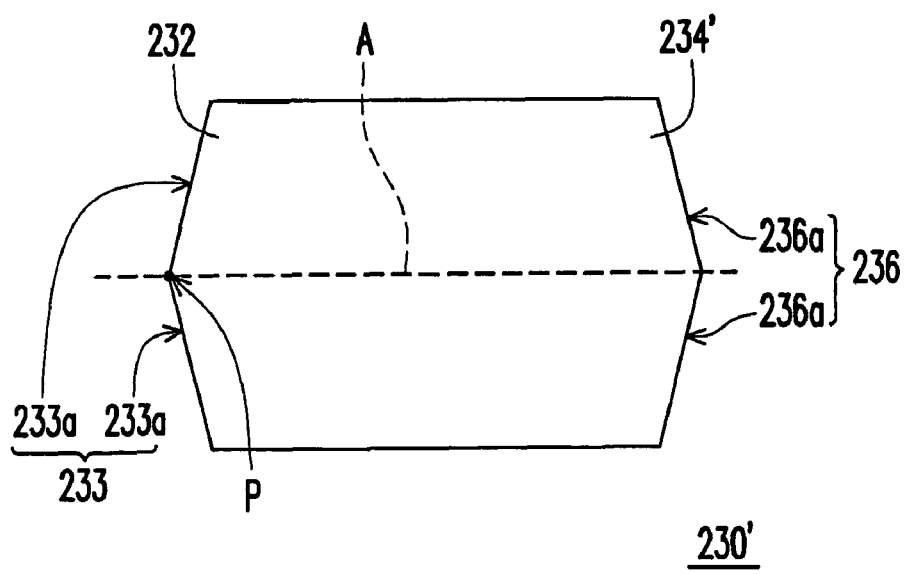
FIG. 5B is a sectional view of the prism in FIG. 5A passing through a axis.

Referring to FIGS. 5A and 5B, in an illumination system according to another embodiment, a prism 230' is used to replace the prism 230 (referring to FIG. 3A). The prism 230' is similar to the prism 230, and the difference between the two is that the light exit end 234' of the prism 230' has an exit polygonal pyramid portion 236 protruding away from the light incident end 232. In this embodiment, the shape of the exit polygonal pyramid portion 236 is the same as that of the incident polygonal pyramid portion 233 (referring to FIG. 3B), i.e., the exit polygonal pyramid portion 236 is also composed of a plurality of triangular facets 236a, and the number of the triangular facets 236a is greater than or equal to 3. The prism 230' also achieves the effect of the prism 230 (referring to FIG. 3A) for reducing the degree of the speckle phenomenon, and thus the details will not be repeated herein again.

Figure 6A:
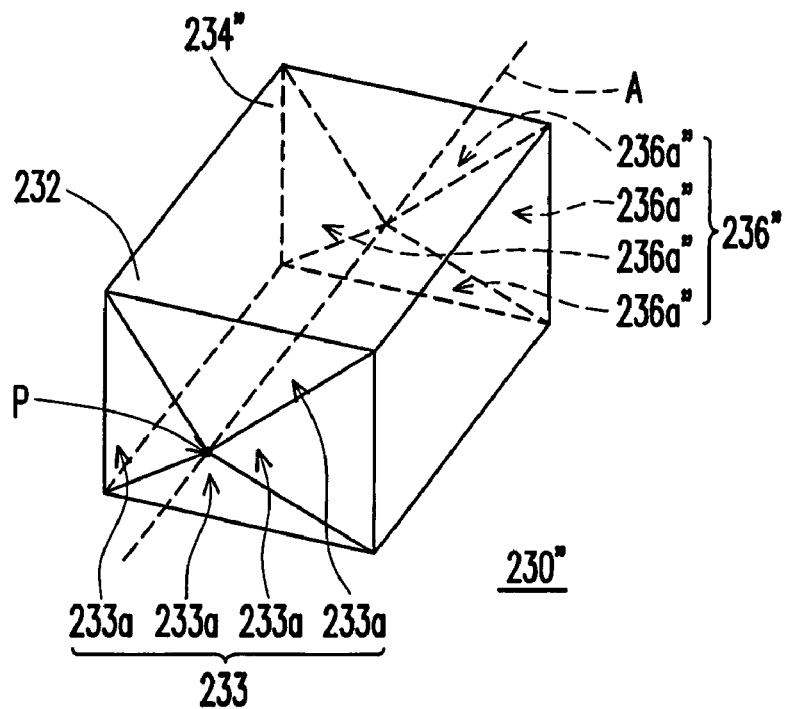
FIG. 6A is a perspective view of a prism in an illumination system according to yet another embodiment of the present invention.
Figure 6B:
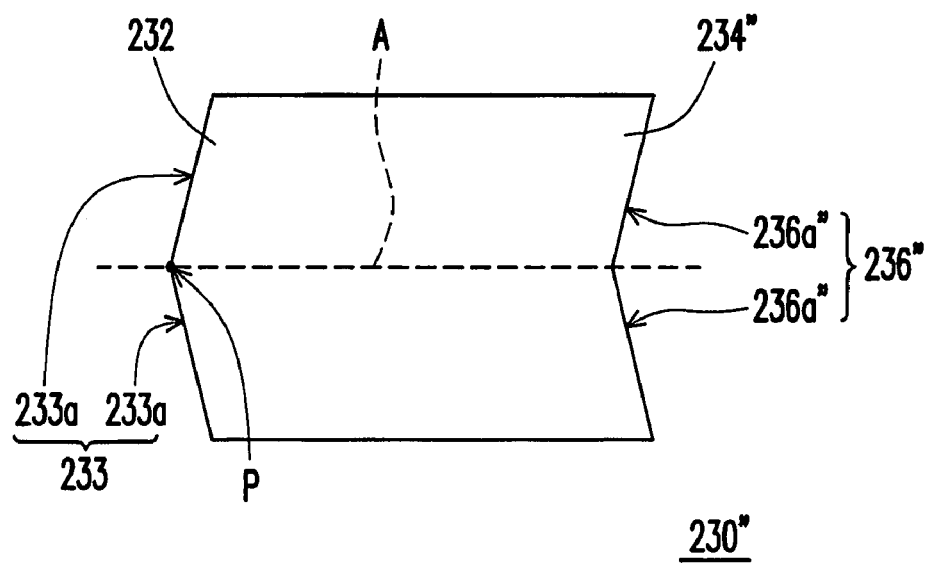
FIG. 6B is a sectional view of the prism in FIG. 6A passing through a axis.

Referring to FIGS. 6A and 6B, in an illumination system according to another embodiment of the present invention, a prism 230" is similar to the prism 230' (as shown in FIG. 5), and the difference between the two is that an exit polygonal pyramid portion 236" of a light exit end 234" of the prism 230" dents towards the light incident end 232. The exit polygonal pyramid portion 236" is also composed of a plurality of triangular facets 236a".

It should be noted that the number of the exit polygonal pyramid portion (such as the exit polygonal pyramid portion 236 or 236") of the light exit end of the prism is not limited to be one in the present invention. In other embodiments, the light exit end of the prism also has a plurality of exit polygonal pyramid portions.

Figure 7A:
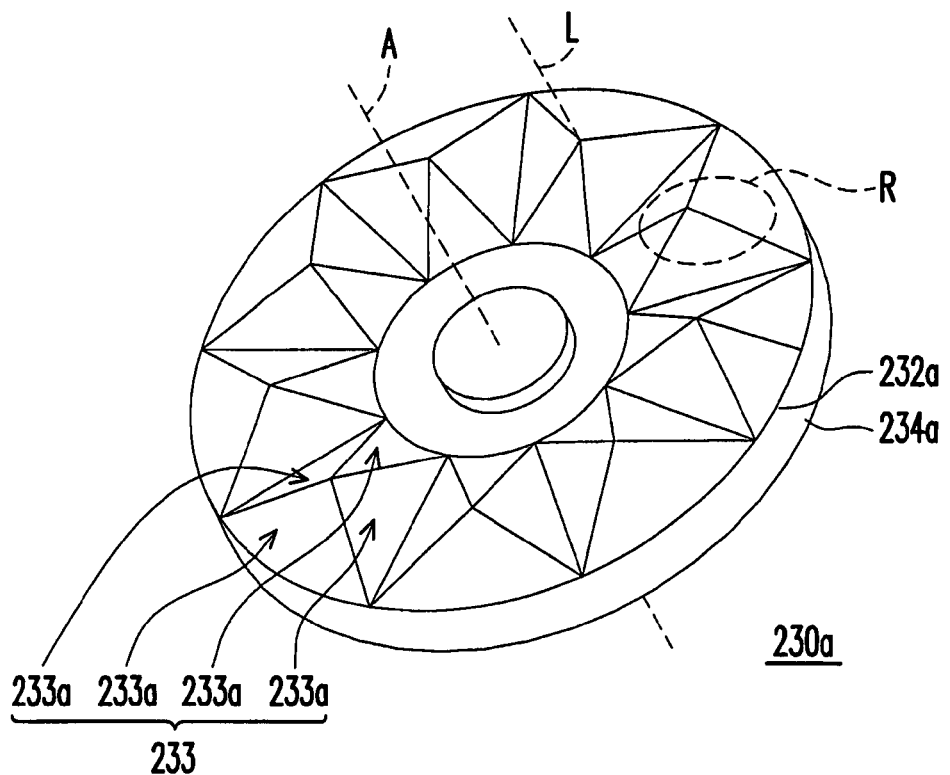
FIGS. 7A and 7B show a prism and an actuator in an illumination system according to another embodiment of the present invention.
Figure 7B:
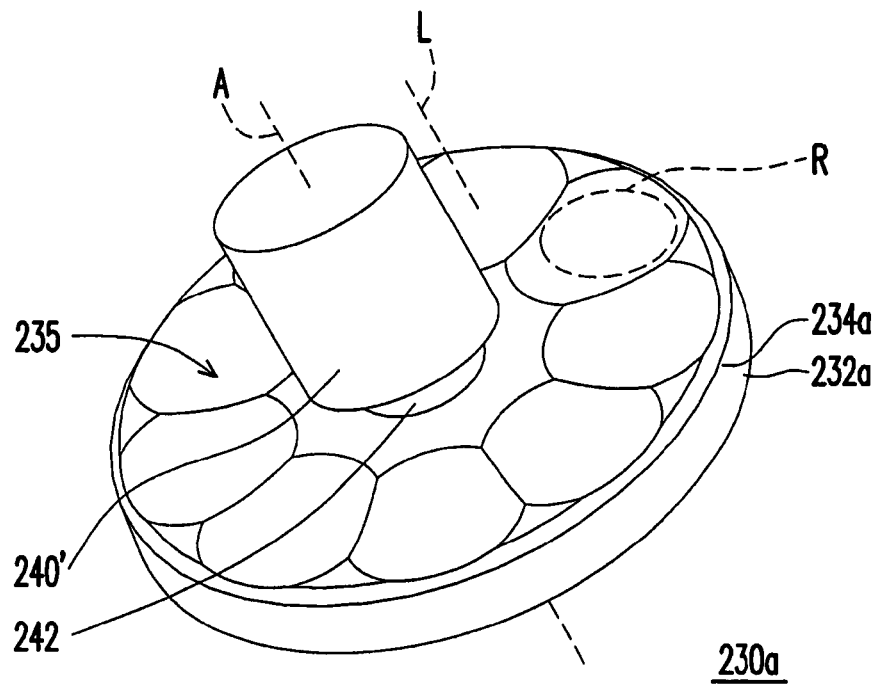

Referring to FIGS. 7A and 7B, in an illumination system according to another embodiment of the present invention, a prism 230a is, for example, annular-shaped, and a light incident end 232a of the prism 230a has a plurality of incident polygonal pyramid portions 233 disposed around the axis A. Moreover, in this embodiment, the light exit end 234a of the prism 230a has a plurality of curved light exit surfaces 235 disposed around the axis A. Besides, each incident polygonal pyramid portion 233 and the corresponding curved light exit surface 235 are fall on a reference line L parallel to the axis A. In addition, an actuator 240' is, for example, a motor having a rotor 242, and the prism 230a surrounds and is connected with the rotor 242 for making the prism 230a to rotate about the axis A.

In this embodiment, when the prism 230a rotates, the coherent beam passes through the incident polygonal pyramid portions 233 sequentially. For example, the range of the coherent beam projected on the prism 230a at a time point is a light acceptance range R as shown in the figures. Therefore, the angle and position of the coherent beam incident on the light uniforming element have more variations, so as to further reduce the degree of the speckle phenomenon. Moreover, the annular-shaped prism 230a is capable of connecting the rotor 242 of the actuator 240' with the prism 230a in the absence of a gear, thereby simplifying the mechanism.

In the illumination system according to other embodiments, a plurality of exit polygonal pyramid portions (such as the exit polygonal pyramid portions 236 and 236") is also used to replace the light exit curved surfaces 235 in the prism 230a.

Figure 8A:
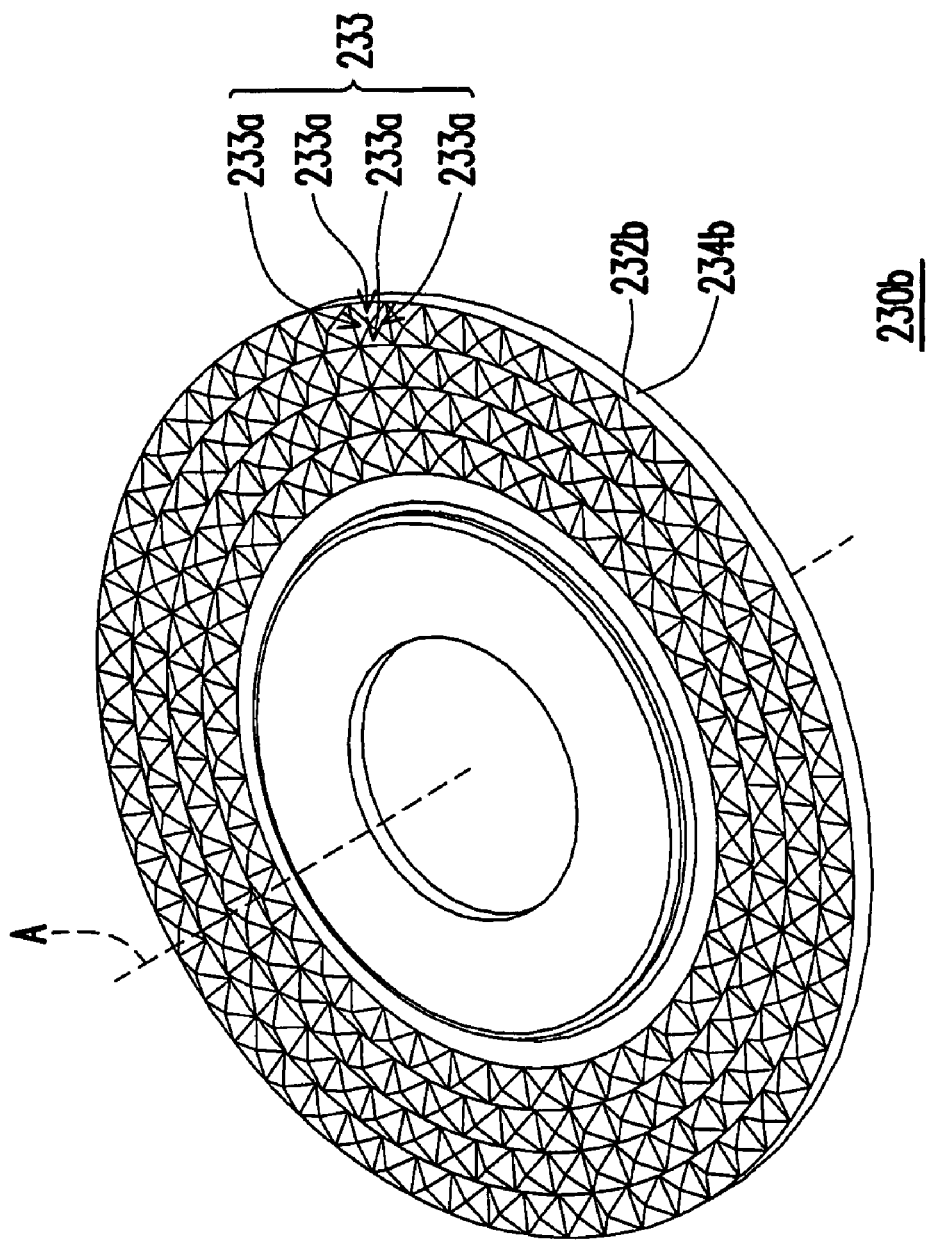
FIGS. 8A and 8B show a prism in an illumination system according to still another embodiment of the present invention.
Figure 8B:
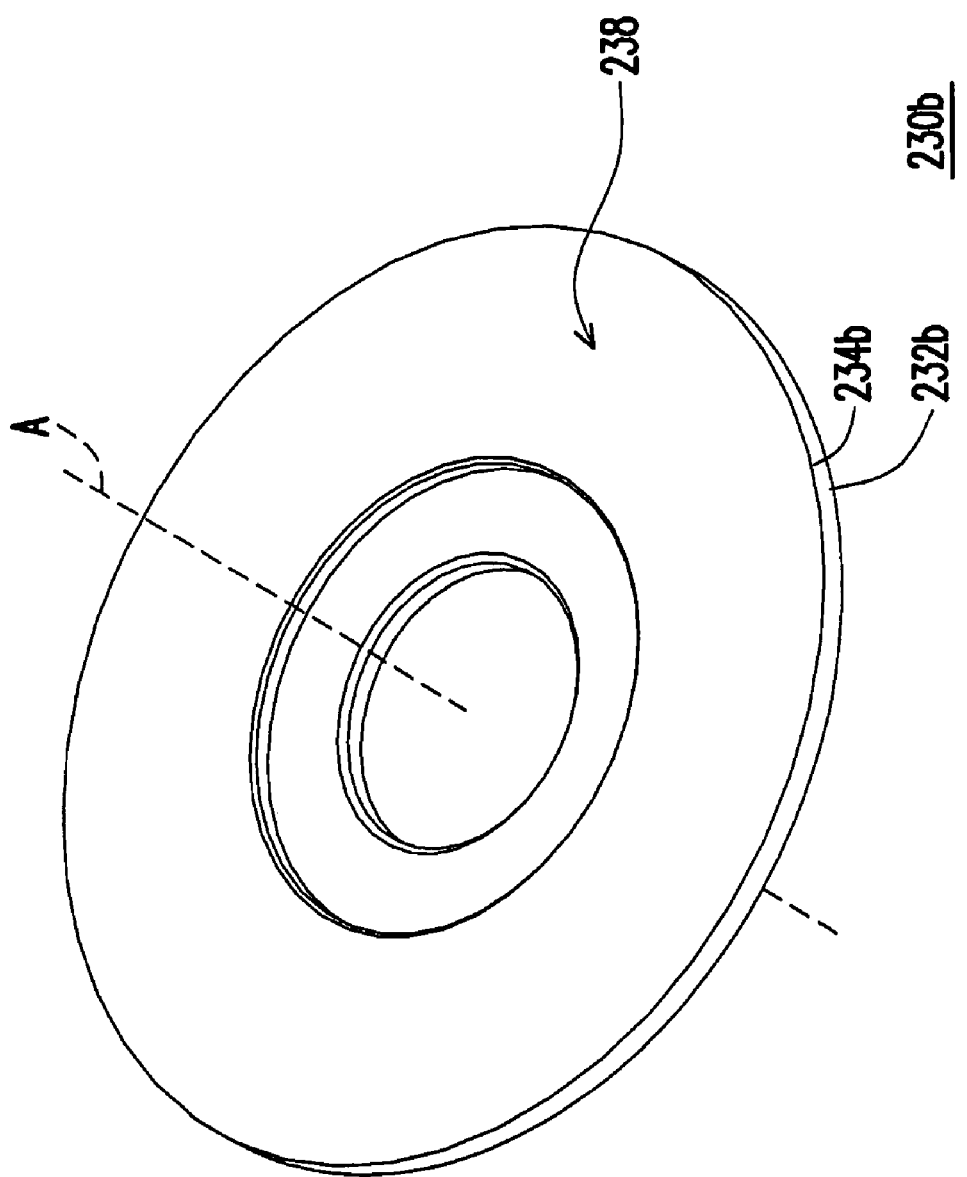

Refereeing to FIGS. 8A and 8B, in an illumination system according to another embodiment of the present invention, incident polygonal pyramid portions 233 of a light incident end 232b of a prism 230b are also disposed around the axis A layer by layer, and the coherent beam passes through the plurality of incident polygonal pyramid portions 233 at a time point, such that the angle and position of the coherent beam incident on the light uniforming element have more variations. Moreover, the light exit end 234b of the prism 230b has a light exit plane 238.

It should be noted that the number of the coherent light source in the illumination system is not limited to be one in the present invention. In other embodiments, the number of the coherent light source in the illumination system is also more than one, and one embodiment is illustrated as follows.

Figure 9:
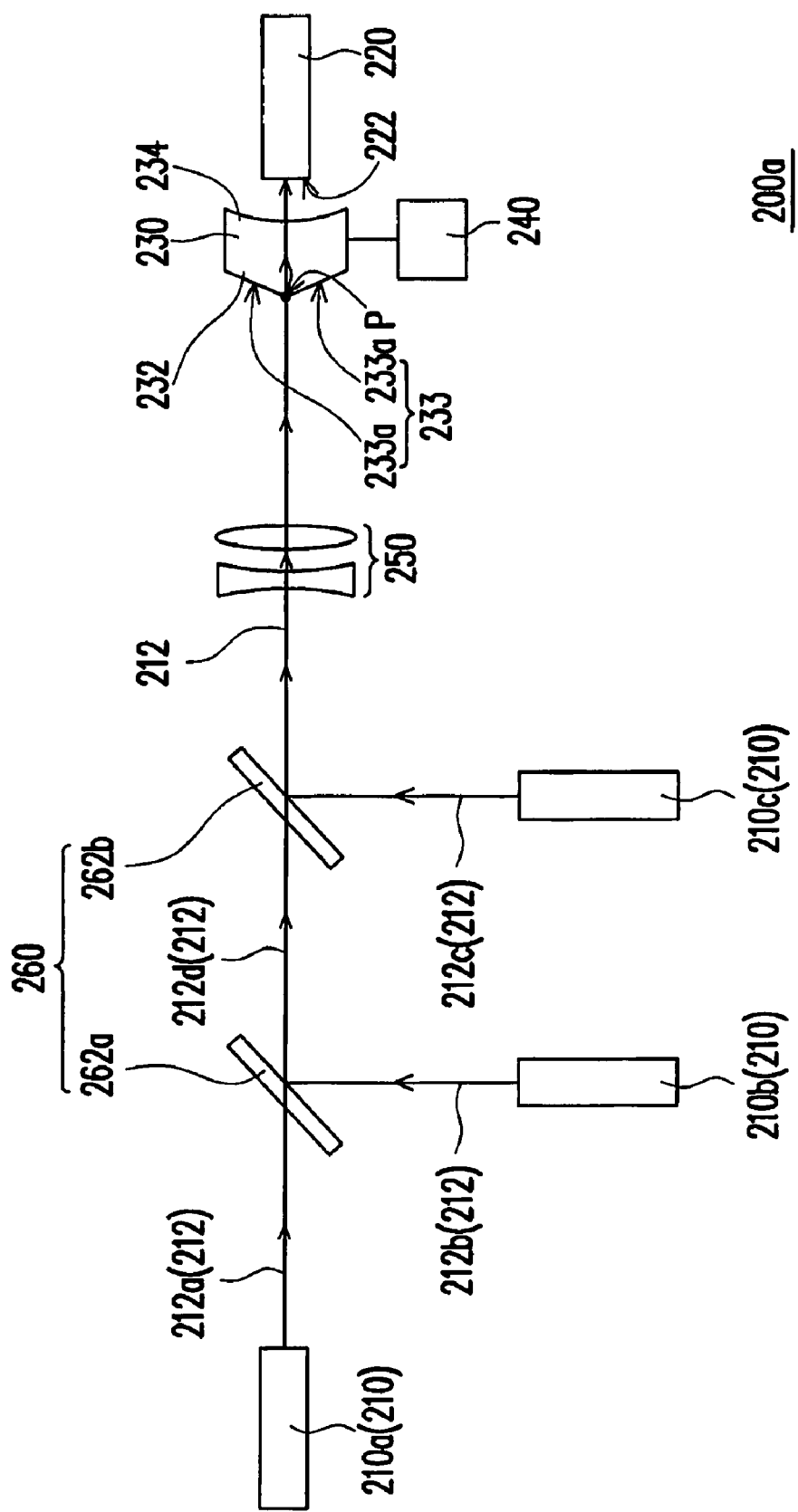
FIG. 9 is a schematic structural view of an illumination system according to still another embodiment of the present invention.

Referring to FIG. 9, an illumination system 200a according to yet another embodiment of the present invention has a plurality of coherent light sources 210, e.g., coherent light sources 210a, 210b, and 210c, and the coherent beams 212 (e.g., coherent light beams 212a, 212b, and 212c) emitted by the coherent light sources 210 have the same or different color(s). Moreover, the illumination system 200a further comprises a light combining unit 260 disposed on the transmission paths of the coherent beams 212 and between the coherent light sources 210 and the prism 230, so as to combine the coherent beams 212 as a whole.

In particular, in an embodiment, the coherent beams 212a, 212b, and 212c have different colors, and the light combining unit 260 comprises two dichroic mirrors 262a and 262b. The dichroic mirror 262a combines the coherent beams 212a and 212b into a coherent beam 212d, and the dichroic mirror 262b further combines the coherent beams 212d and 212c as a whole. When the colors of coherent beams 212a, 212b, and 212c are red, green, and blue, the light combining unit 260 combines the coherent beams 212 into a white beam. As such, the illumination system 200a outputs a white light. In other embodiment, the light combining unit is also an X-cube.

Figure 10:
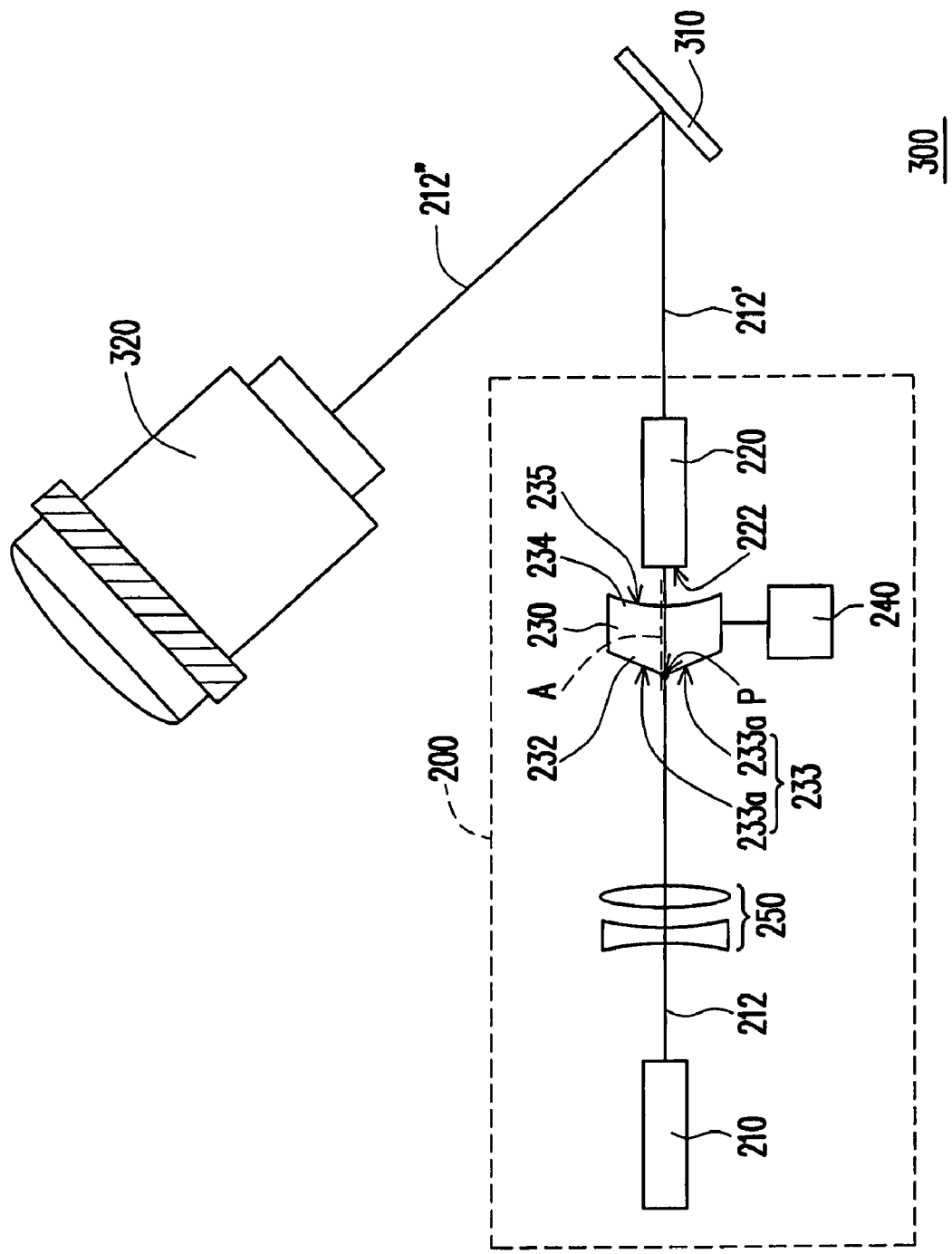
FIG. 10 is a schematic structural view of a projection apparatus according to an embodiment of the present invention.

Referring to FIG. 10, a projection apparatus 300 according to an embodiment of the present invention includes the above illumination system 200, a light valve 310, and a projection lens 320. The illumination system 200 is capable of providing an illumination beam 212', and the light uniforming element 220 is used to uniform the coherent beams 212 to form the illumination beam 212'. The light valve 310 is disposed on the transmission path of the illumination beam 212', so as to convert the illumination beam 212' into an image beam 212", and the light valve 310 is, for example, a digital micro-mirror device (DMD), a liquid crystal on silicon panel (LCOS panel), a transmissible liquid crystal panel, or other elements having a function of light modulation. The projection lens 320 is disposed on the transmission path of the image beam 212", so as to project the image beam 212" on the screen to form a display image. Since the illumination system 200 effectively reduces the degree of the speckle phenomenon, the projection apparatus 300 of this embodiment provides a display image having a uniform brightness and has a preferred optical quality.

It should be noted that, in other embodiments, the illumination system 200 in the projection apparatus 300 is also replaced by the illumination system in other embodiments mentioned above. Moreover, the projection apparatus also includes an illumination system having a plurality of the coherent light sources, and use the light combining unit to combine the plurality of coherent beams emitted by the coherent light sources as a whole.

Based on the above, in the illumination system of the present invention, the prism rotates, and the incident polygonal pyramid portion splits the coherent beam into a plurality of beams incident on the light uniforming element from different angles, so the spots formed on the light incident section of the light uniforming element by the beams rotate with the rotation of the prism, and the incident angles of the beams on the light uniforming element change with the rotation of the prism. Thereby, the speckle pattern output by the illumination system changes with time. Due to the visual persistence effect, the human eyes observe the superposition of the speckle patterns at different time points in a visual persistence time interval. The speckle distributions in the speckle patterns at different time points are different, such that a pattern having a more uniform brightness is generated after the superposition. Therefore, the illumination system of the present invention effectively reduces the degree of the speckle phenomenon, and the projection apparatus using the illumination system of the present invention provides display images having a uniform brightness.

Moreover, each beam split by the incident polygonal pyramid portion forms a corresponding speckle pattern, so the speckle pattern generated at a time point in the present invention is a superposition of a plurality of speckle patterns, such that the illumination system of the present invention remarkably reduces the degree of the speckle phenomenon.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:
   at least one coherent light source, for emitting a coherent beam;
   a light uniforming element, disposed on a transmission path of the coherent beam; and
   a prism, disposed on the transmission path of the coherent beam and between the coherent light source and the light uniforming element, the prism having a light incident end and a light exit end, wherein the light incident end has at least one incident polygonal pyramid portion protruding away from the light exit end, and the prism is capable of rotating about an axis, and the axis extends from the light incident end to the light exit end, and an apex of the incident polygonal pyramid portion is located on the axis, and wherein the light exit end has at least one curved light exit surface denting towards the light incident end or protruding away from the light incident end, a chief ray of the coherent beam passes through the apex and the axis, and the rotation of the prism makes a position and an angle of the coherent beam incident on the light uniforming element change with time.

2. The illumination system as claimed in claim 1, wherein the incident polygonal pyramid portion is composed of a plurality of triangular facets, and a number of the triangular facets is greater than or equal to 3.

3. The illumination system as claimed in claim 1, wherein the prism is annular-shaped, a number of the at least one incident polygonal pyramid portion is more than one, and the incident polygonal pyramid portions are disposed around the axis.

4. The illumination system as claimed in claim 1, wherein a number of the at least one incident polygonal pyramid portion is more than one, a number of the at least one curved light exit surface is more than one, and each incident polygonal pyramid portion and one of the curved light exit surfaces fall on a reference line parallel to the axis.

5. The illumination system as claimed in claim 1, wherein the prism is annular-shaped, a number of the at least one curved light exit surface is more than one, and the curved light exit surfaces are disposed around the axis.

6. The illumination system as claimed in claim 1, wherein the axis is substantially parallel to a chief ray of the coherent beam.

7. The illumination system as claimed in claim 1, further comprising an actuator connected with the prism for driving the prism to rotate.

8. The illumination system as claimed in claim 7, wherein the actuator comprises a motor having a rotor, the prism is annular-shaped, and the prism surrounds and is connected with the rotor for making the prism rotate about the axis.

9. The illumination system as claimed in claim 1, wherein the coherent light source comprises a laser light source.

10. The illumination system as claimed in claim 1, wherein the light uniforming element comprises a light integration rod.

11. The illumination system as claimed in claim 1, further comprising a beam expander disposed on the transmission path of the coherent beam and between the coherent light source and the prism.

12. The illumination system as claimed in claim 1, wherein a number of the at least one coherent light source is more than one, and the illumination system further comprises a light combining unit disposed on the transmission paths of the coherent beams and between the coherent light sources and the prism, for combining the coherent beams as a whole.

13. The illumination system as claimed in claim 1, wherein the light exit end has at least one light exit plane.

* * * * *